United States Patent [19]

Olginsky et al.

[11] Patent Number: 4,909,821
[45] Date of Patent: Mar. 20, 1990

[54] APPARATUS FOR GRANULATING METALLURGICAL MELT

[76] Inventors: Felix Y, Olginsky, Vasnetsova, 15, Kv. 86, Moscow; Mikhail A. Sharanov, ul. Tekhnologicheskaya, 3, kv. 19, Sverdlovsk, both of U.S.S.R.

[21] Appl. No.: 177,910

[22] Filed: Mar. 29, 1988

Related U.S. Application Data

[63] Continuation of Ser. No. 915,251, filed as PCT SU85/00067 on Aug. 1, 1985, published as WO86/04052 on Jul. 17, 1986, abandoned.

[51] Int. Cl.⁴ .............................................. C03B 5/23
[52] U.S. Cl. ........................................ 65/141; 65/18.1; 65/215; 65/181; 241/39; 241/46.02; 241/46.17; 241/64; 425/6
[58] Field of Search ................. 65/19, 18.1, 141, 21.2, 65/21.5, 181; 241/39, 46.02, 46.17, 64; 425/6

[56] References Cited

U.S. PATENT DOCUMENTS

| | | |
|---|---|---|
| 4,268,295 | 5/1981 | Yamamoto et al. ................ 65/19 |
| 4,289,519 | 9/1981 | Monteyne ........................... 65/19 |
| 4,446,207 | 5/1984 | Dewitte et al. ..................... 65/21.3 |
| 4,477,349 | 10/1984 | Monteyne ......................... 65/19 |

FOREIGN PATENT DOCUMENTS

| | | | |
|---|---|---|---|
| 56-36138 | 2/1981 | Japan . | |
| 56-380 | 7/1981 | Japan . | |
| 58-35943 | 5/1985 | Japan . | |
| 331820 | 4/1972 | U.S.S.R. . | |
| 519403 | 8/1976 | U.S.S.R. . | |
| 1085948 | 4/1984 | U.S.S.R. ..................... | 65/181 |
| 1181530 | 9/1985 | U.S.S.R. . | |

Primary Examiner—David L. Lacey
Assistant Examiner—Lori-Ann Johnson
Attorney, Agent, or Firm—Burgess, Ryan and Wayne

[57] ABSTRACT

An apparatus for granulating metallurgical melt, including a granulator (1) having a water supply (13), a trough (2) for supplying metallurgical melt thereto, and a rotary driven drum (3) having blades (6). A water tank (11) having an overflow device (12) is disposed under the drum (3). The granulator (1) and trough (2) are disposed in the interior of the drum (3), the lower part of the drum being disposed in the tank (11) below the overflow device (12), The apparatus is provided with a trough (22) for discharging granules from the drum (3).

3 Claims, 1 Drawing Sheet

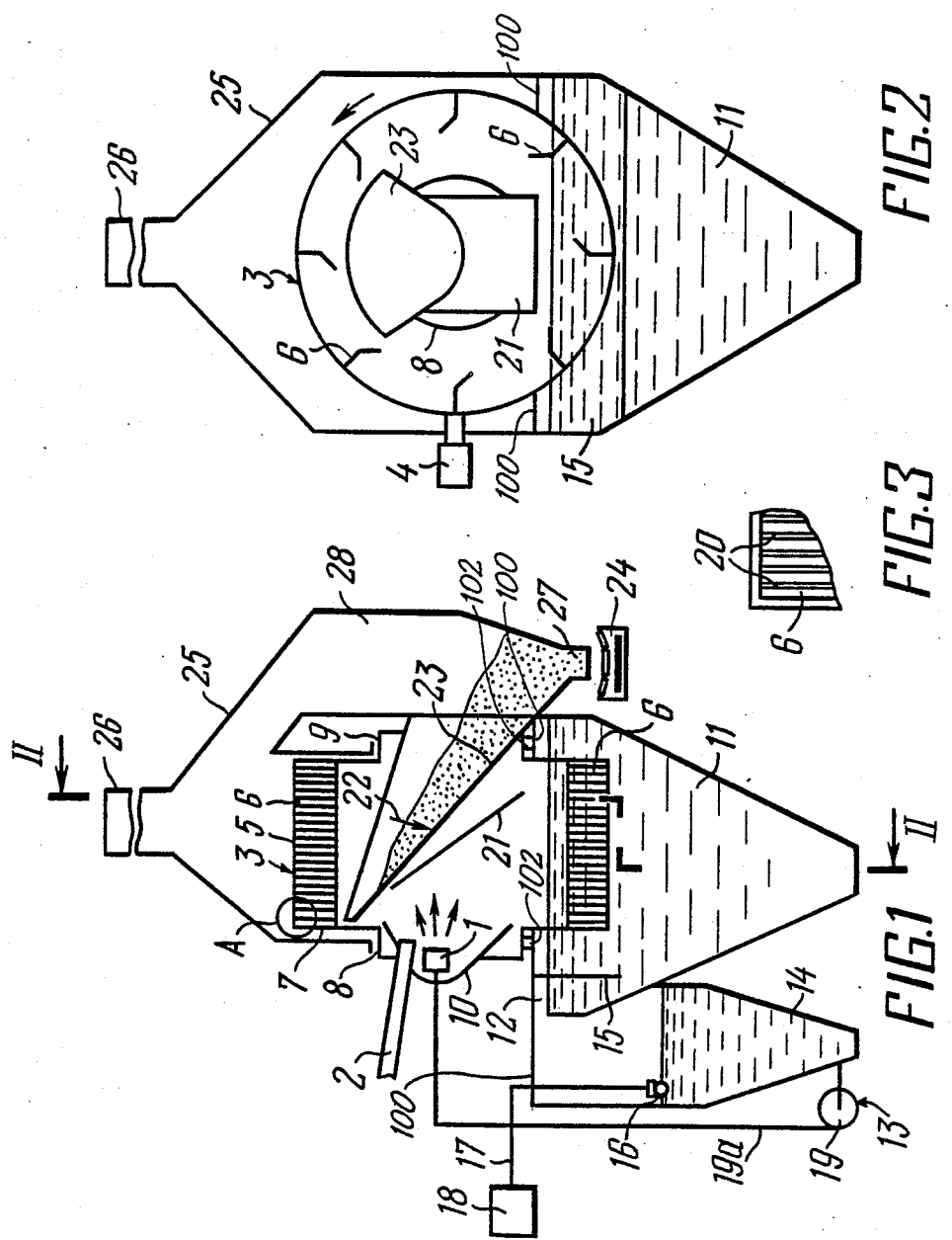

APPARATUS FOR GRANULATING METALLURGICAL MELT

This application is a continuation of application Ser. No. 915,251, filed as PCT SU85/00067 on Aug. 1, 1985, published as WO86/04052 on Jul. 17, 1986 now abandoned.

TECHNICAL FIELD

The invention relates to metallurgy, and more specifically, it deals with an apparatus for granulating metallurgical melt.

BACKGROUND OF THE INVENTION

Known in the art is an apparatus for granulating metallurgical melt (cf. USSR Patent No. 1,181,530, Int. Cl. C 04 B 5/02, 1978; Off-Bull. No. 35, 1985).

The prior art apparatus for granulating metallurgical melt, and more specifically, for granulating a blast furnace slag, comprises a hydraulic granulator and a trough for supplying metallurgical melt running thereover. The granulator also has a trough for removing therefrom a mixture of granulated slag and water, i.e. a slurry, into a slurry collector comprising a hopper having a horizontally extending distribution channel having an opening in the bottom part thereof for slurry discharge, the hopper being installed adjacent to the trough.

A rotary driven drum having perforated walls is installed so that its axis extends horizontally. The drum has blades for moving granules during rotation. The blades are secured to the peripheral walls of the drum to extend inwardly of the drum. The horizontal distribution channel is received in the drum.

A tank for collecting water flowing throught the drum perforation is installed immediately under and below the drum. The tank has an overflow device for removing an excess of water when water level in the tank rises above an admissible level.

A vertical plate is installed in the tank, on a cover plate thereof, the lower end of the plate being spaced from the bottom wall of the tank. The vertical plate comprises a skimmer and is used to define a part of the tank in which clarified water is collected after precipitation of solid particles.

A means is provided for discharging granules from the drum, which comprises a conveyor extending substantially inside the drum along its axis immediately above the horizontal slurry distribution channel.

Another conveyor is provided under the conveyor for discharging granules from the drum for conveying them either to a storage place or for shipping.

A forced draft cooling tower is provided for cooling water, the clarified water from the tank being pumped to the cooling tower.

A means for supplying water to the granulator is also provided, which comprises a pump for supplying clarified water to the forced draft cooling tower which is connected to the part of the tank for clarified water defined by the skimmer. Another tank for collecting water flowing from the forced draft cooling tower is installed directly under the cooling tower.

The means for supplying water to the granulator also comprises another pump connected to the other tank for supplying a substantial amount of water to the granulator for the granulation proper.

The granulator, slurry removal trough, slurry collector, and drum are covered by a casing having a vent pipe.

The prior art apparatus for granulating metallurgical melt is rather unreliable in operation as molten metal, slag crust, coke lumps fused with metal, and other materials can get into slag during granulation so as to result in explosions and emergency situations.

This is due to the fact that in case slag containing molten metal, crust, and the like gets through water jets from the granulator to the surface of metal members of structures washed with water, closed water-filled spaces are formed between this surface and the slag impinging thereon, and water, which evaporates momentaneously, causes a explosion which may result in a destruction of the metal structure.

In addition, a rather sophisticated and cumbersome system of recirculation (closed-loop) water supply system is used in the prior art granulation apparatus, which makes it difficult to run the apparatus and increases its size.

Granules produced in the prior art apparatus features a rather high moisture content because of a prolonged time of contact of slag with water during granulation and conveyance of slurry through the granulator, trough, slurry collector, horizontal distribution channel and also due to their relative position.

SUMMARY OF THE INVENTION

The main object of the invention is to provide an apparatus for granulating metallurgical melt, in which a granulator, a trough for supply slag to the granulator, a drum and a tank for collecting water and the drum are so positioned relative to one another as to ensure high reliability of the apparatus with a comparatively small size and simple structure.

This object is accomplished by providing an apparatus for granulating metallurgical melt, comprising a granulator having a water supply means, a trough for supplying metallurgical melt to the granulator, a rotary driven drum having perforated walls and blades for moving granules on the peripheral wall thereof extending inwardly of the drum, a water collecting tank installed under the drum and having an overflow device, and a means for discharging granules from the drum. According to the invention, the granulator and trough are disposed in the interior of the drum, the lower part of the drum being disposed in the tank below the overflow device.

With such position of the granulator, trough for supplying metallurgical melt thereto, and drum, and also of the drum and tank relative to one another, the possibility of explosions is prevented. This is due to the fact that only preliminarily comminuted particles of metallurgical melt in the form of granules getting to the water surface in the lower part of the drum, that had time to solidify, can come in contact with members of the metal structure of the apparatus for granulating metallurgical melt.

In addition, the apparatus for granulating metallurgical melt according to the invention is very compact since both the trough and granulator are disposed in the interior of the drum, the lower part of the drum being disposed in the tank.

The apparatus for granulating metallurgical melt according to the invention does not call for a sophisticated recirculation water supply system with settling tanks, pumps and a cooling tower.

The drum blades are preferably made with apertures extending transversely to each blade.

The provision of the apertures ensures complete removal of water from granules during their conveyance by the blades.

The provision of the apertures extending transversely to each blade, i.e. in the direction of spillage of granules ensures self-cleaning of the apertures by the granules being spilled.

It is preferred that a screen be provided in the interior of the drum for dispersing granules and for deflecting them into the lower part of the drum, the screen comprising a plate extending at an acute angle to the axis of the drum and open toward the granulator.

The screen ensures an improvement in reliability of the apparatus for granulating metallurgical melt in operation owing to additional comminution of granules before they fall into the water in the lower part of the drum which, in turn, also contributes to the prevention of explosions.

At the same time, the screen protects the drum against abrasive wear by granules.

It is preferred that the means for discharging granules from the drum include an inclined trough, the upper portion of the trough being disposed in the interior of the drum and the lower portion being disposed outside the drum.

With the granulator and trough being disposed in the interior of the drum in which granulation proper take place, this construction of the means for discharging granules from the drum is most advantageous since it is only fixed members that are disposed in the interior of the drum.

In addition, the trough of said means is simple and reliable in operation and does not have any movable members, nor does it call for special repair and maintenance during operation.

Therefore, the apparatus for granulating metallurgical melt according to the invention is highly reliable and absolutely explosion-safe.

In addition, the apparatus for granulating metallurgical melt according to the invention is rather simple in structure and convenient in operation; it occupies a comparatively small production area so that it may be installed adjacent to operating blast furnaces under restructed conditions of a blast furnace shop.

BRIEF DESCRIPTION OF DRAWING

A specific embodiment of the invention will now be described with reference to the accompanying drawings, in which:

FIG. 1 schematically shows, in longitudinal section, an apparatus for granulating metallurgical melt according to the invention;

FIG. 2 is, a sectional view taken along line II—II in FIG. 1;

FIG. 3 schematically shows an enlarged detail A in FIG. 1.

BEST MODE FOR CARRYING OUT THE INVENTION

An apparatus for granulating metallurgical melt according to the invention, which is hereinafter referred to as "an apparatus" for the sake of brevity, comprises a granulator 1 (FIG. 1) of a hydraulic type of any appropriate known design. Mechanical or air-water granulators may also be used.

A trough 2 is provided for supplying metallurgical melt to the granulator, and in this embodiment the metallurgical melt is in the form of high-temperature slag fed directly from a blast furnace (not shown in the drawings).

The granulator 1 is designed for forming granules from slag by acting upon slag with a water jet under pressure and is disposed under the outlet portion or tip (not referenced) of the trough 2.

The apparatus according to the invention also has a drum 3 with a horizontal longitudinal axis which is rotated by a drive 4 (FIG. 2) comprising an electric motor of any appropriate known type.

The drum 3 has a cylindrical perforated peripheral wall 5 (FIG. 1) to which are secured blades 6 extending inwardly of the drum. The blades 6 are designed for moving granules formed during granulation. The number of the blades 6 is eight in this embodiment. The number of the blades 6 may be either larger or smaller than eight in other applications. The blades 6 are uniformly spaced along the peripheral wall 5 of the drum 3.

As shown in FIG. 2, each blade 6 is bent so as to define an obtuse angle at the bend. The blades 6 may also be shaped otherwise.

The granulator 1 and trough 2, namely its tip, are disposed in the interior of the drum 3 as shown in FIG. 1.

End walls 7 of the drum 3 have protruding portions 8 and 9 in the form of hollow cylinders, the protruding portion 8 being on the lefthand side and the protruding portion 9 being on the righthand side in FIG. 1. The protruding portion 8 accommodates the granulator 1 and trough 2, namely its tip. The granulator 1 and trough 2 are covered with a fixed hood 10 secured to the drum 3 by any appropriate known means (not shown in the drawings).

The apparatus according to the invention has a water tank 11 installed directly under the drum 3. The tank 11 is provided with an overflow device 12 comprising an overflow channel disposed between the side wall and cover plate 100 of the tank 11. The overflow device 12 is designed for discharging from the tank 11 an excess of water.

The drum 3 is installed on the cover plate of the tank 11 by means of roller supports 102.

The lower part of the drum 3 is disposed in the tank 11 below the overflow device 12.

A means 13 is provided for supplying water to the granulator 1, said means comprising an auxiliary tank 14 disposed adjacent to the tank 11 on the side of the overflow device 12. A vertical plate 15 secured to a cover plate of the tank 11 is installed in the tank 11 adjacent to the overflow device 12. The plate 15 comprises a skimmer and is designed for retaining suspended particles in the tank 11 when water overflows from the tank 11 to the tank 14.

The auxiliary tank 14 has a level regulator 16 of any appropriate known type communicating, via a pipeline 17, with a water supply source 18 under pressure connected to an external water supply system.

The means 13 also comprises a pressure source 19 comprising a pump of any appropriate known type also shown at 19, and a pipeline 19a through which the lower part of the auxiliary tank 14 communicates with the granulator 1.

The overflow device 12 and means 13 for supplying water to the granulator 1 ensure maintenance of a constant water level in the tank 11.

In case granulators of mechanical or air-water type are used, water required for maintaining a constant level in the tank 11 may be supplied by the pump 19 directly into the interior space of the drum 3 bypassing the granulator.

Maintaining a constant level of water in the tank 11 is necessary to ensure that the lower part of the drum 3 should always be immersed in water for a rapid cooling of granules conveyed by the blades 6.

The blades 6 of the drum 3 are made with apertures 20 (FIG. 3) disposed transversely of the blades 6, i.e. the apertures 20 are oriented in the direction of granules spillage from the blades 6 in the upper part of the drum 3.

A screen 21 (FIG. 1) is installed in the interior of the drum 3 for dispersing granules and for deflecting them into the lower part of the drum 3.

The screen 21 comprises a plate extending at an acute angle to the axis of the drum 3 open toward the granulator 1. The screen 21 is disposed directly opposite to the granulator 1. The screen 21 is secured in the interior of the drum 3 by means of stationary structural members of the apparatus which are not described.

The apparatus according to the invention also has a means 22 for discharging granules from the drum 3, which comprises an inclined trough 23. The upper portion of the trough 23 is disposed in the interior of the drum 3, and the lower portion of the trough is disposed outside the drum 3. The trough 23 is rigidly secured in the interior of the drum 3 by any appropriate known means which are not disclosed here.

The angle of inclination of the trough 23 should be large enough for the granules to be spilled therealong, namely it should be at least 40°, and in this embodiment it is equal to 40°.

A conveyor 24 for conveying granules is installed under the lower end of the trough 23.

The top part of the apparatus according to the invention is covered by a casing 25 which comprises a pipe 26 in the lower part thereof for discharging a steam and gas mixture formed during granulation into atmosphere.

The lower extremity of the righthand side wall of the casing 25 (FIG. 1) defines with the lower end of the trough 23 a hopper 27 for discharging dehydrated granules.

The lower portion of the trough 23 is made integral with the casing 25.

The casing 25 has walls (unreferenced) on the side of the protruding portion 9 of the end wall 7 of the drum 3, which define a channel 28 for an orderly discharge of a steam and gas mixture.

The apparatus for granulating metallurgical melt according to the invention functions in the following manner.

After a signal indicating the discharge of slag from a blast furnace is received, the operator switches on the drive 4 for rotating the drum 3 in the direction of arrow in FIG. 2, the lower part of the drum being disposed below the overflow device 12. The overflow device 12 maintains a constant water level in the tank 11 with the aid of the means 13 for supplying water to the granulator 1 which is switched on simultaneously with the drive 4 of the drum 3.

The pump 19 supplies water for granulation through the pipeline 19a to the granulator 1 from the auxiliary tank 14 to which clarified excess of water continually overflows from that part of the tank 11 which is defined by the plate 15 and the side wall of the tank 11 through the overflow device 12. The desired level of water in the auxiliary tank 14 is maintained by means of the level regulator 16 communicating with the water source 18 of an external water supply system through the pipeline 17.

This facility prevents the possibility of explosions to a substantial extent because the lower part of the drum 3 is always immersed in water.

Metallurgical melt, slag in this case, flows down through the trough 2 toward the granulator 1 wherein it is broken to particles by water jets and is deflected by the screen 21 to be additionally comminuted and to pass, in the form of granules, into the lower part of the drum 3 which continuously rotates about the horizontal axis.

In case a mechanical granulator is used, slag is broken to particles by the granulator blades and passes to the screen 21 while being wetted with water, whereafter it is finally cooled in the granular form in the lower part of the drum 3 filled with water.

In case an air-water granulator is used, slag is broken to particles with a mixture of water supplied from the pipeline 19a and compressed air fed from any appropriate external air supply source. Then slag particles passes to the screen 21 and to the lower part of the drum 3 filled with water.

Granules in the lower part of the rotating drum 3 are engaged with the blades 6 and conveyed into the upper part of the drum 3 wherefrom they are spilled into the trough 23. During conveyance of the granules, water available in the granules flows down through the apertures 20 of the blades 6.

The moisture content of granules is also lowered by using residual heat of the granules for drying them which may be achieved by setting-up a certain speed of the drum 3 controlled within a desired range by any appropriate known means (not shown in the drawings).

Granules are spilled from the trough 23 into the hopper 27 and are then fed to the conveyor 24 for conveying them to a storage place or for shipping.

Steam and gas mixture formed during granulation is discharged through the channel 28 into the pipe 26 and thereafter into atmosphere.

INDUSTRIAL APPLICABILITY

The invention may be the most advantageously used for granulating slags from blast furnaces.

An apparatus for granulating metallurgical melt according to the invention may also be used for granulating slags of steel smelting, ferroalloy and other processes.

What we claim is:

1. An apparatus for granulating metallurgical melt comprising:
   a rotary drum for contacting a granulated melt with water to obtain cooled solid granules from said granulated melt, said drum having a perforated side wall for removal of water;
   blades secured on said side wall of said drum and protruding inside of said drum for displacement of said granules;
   a first water tank containing water placed under said drum so that the lower part of said drum is located in said tank with the lower part of said drum being below the top of a side wall of the first water tank and within the water contained within said water tank to a level sufficient to ensure contact of the granulated melt with the water and to provide an explosion-proof operation;
   granulator means in the interior of the drum for granulating a metallurgical melt;

trough means for supplying the metallurgical melt to the granulator means;

one end of said trough means being adapted to be in flow communication with a metallurgical furnace;

another end of said trough means being positioned within the interior of the drum directly over said granulator means;

a second water tank connected to said granulator means and adjoining said first water tank, said second water tank being positioned below an overflow side wall of said first tank;

a cover in covering relation to adjoining portions of said first and second tanks;

an overflow channel formed between said cover and said overflow side wall of the first tank so as to provide for overflow of water in said first tank to said second water tank; and removing means for removing said granules, said removing means including an inclined trough having an upper part located in the interior of the drum, and a lower part disposed outside of the drum.

2. An apparatus for granulating metallurgical melt according to claim 1, further comprising:

means for defining apertures for removal of water from the granules, said apertures defined in the surface of each of said blades in the direction that the granules are spilled from the blades.

3. An apparatus for granulating metallurgical melt according to claim 1, further comprising:

screen means for dispersing granules and deflecting said granules to the lower part of said drum, said screen means including a plate set at an acute angle to the axis of rotation of said drum and open toward said granulator means.

* * * * *